United States Patent [19]

Schwanz et al.

[11] 4,256,331

[45] Mar. 17, 1981

[54] PASSIVE SAFETY BELT ARRANGEMENT FOR VEHICLES

[75] Inventors: Wilfried Schwanz, Ahnsen; Ulrich Seiffert, Brunswick, both of Fed. Rep. of Germany

[73] Assignee: Volkswagenwerk AG, Wolfsburg, Fed. Rep. of Germany

[21] Appl. No.: 38,191

[22] Filed: May 11, 1979

[30] Foreign Application Priority Data

May 13, 1978 [DE] Fed. Rep. of Germany ....... 2821151

[51] Int. Cl.³ .............................................. B60R 21/10
[52] U.S. Cl. ..................................... 280/804; 74/527; 280/808
[58] Field of Search ............... 280/802, 803, 804, 808; 74/527

[56] References Cited

U.S. PATENT DOCUMENTS 4,039,224  8/1977  Bauer .................................. 280/804

FOREIGN PATENT DOCUMENTS 2314358 10/1973 Fed. Rep. of Germany ........... 280/804
2440990 11/1976 Fed. Rep. of Germany ........... 280/804
2649465  3/1978 Fed. Rep. of Germany ........... 280/804

Primary Examiner—John J. Love
Assistant Examiner—Randall A. Schrecengost
Attorney, Agent, or Firm—Brumbaugh, Graves, Donohue & Raymond

[57] ABSTRACT

A passive safety belt arrangement for a vehicle includes a safety belt articulately connected to a slide. The slide is acted on by a slide-positioning device so as to move it in a guide fastened to the frame of the vehicle in the region of a door opening next to a seat. The slide is driven between an off position in which the safety belt is raised away from the body of a passenger in the seat and a restraining position in which the belt contacts the passenger's body. The belt is locked in the restraining position by a swiveling locking pawl acted upon by a spring so as to urge it into engagement with the slide. A cam-like projection on the locking pawl is contacted during a permissible movement of the slide by the slide-positioning devices so as to swivel the locking pawl out of engagement with the slide.

4 Claims, 2 Drawing Figures

PASSIVE SAFETY BELT ARRANGEMENT FOR VEHICLES

BACKGROUND OF THE INVENTION

The present invention relates to passive safety belt arrangements for vehicles, e.g. passenger automobiles, and, more particularly, to devices in which the belt is shifted along a guide in the frame of the vehicle.

In German Offenlegungsschrift No. 27 24 402 there is shown a passive restraint system in which one end of a safety belt is articulately coupled to a member that slides in a guide fastened to the frame of the vehicle. The guide is located in the region of a door opening positioned in the vicinity of the vehicle seat. Shifting of the articulation member takes place between an off position in which the safety belt is raised away from the body of the passenger and a restraining position which brings the safety belt in contact with his body, roughly at the height of his shoulders. The guide, within the range of the restraining position, runs essentially vertically along a door post. There is also provided a locking mechanism that, when the belt is in the restraining position, secures the articulation member against undesired sliding, thus assuring that the belt articulation member stays in the restraining position and safely transmits the forces acting on the belt to the vehicle frame, even if the vehicle overturns. This locking mechanisms consists essentially of a lock bolt on the frame that is controlled by a vacuum actuated control unit. When the belt articulation member slides into the restraining position, this bolt is operated by the control unit so as to engage in a through hole provided in the member. However, the vacuum-actuated control unit is expensive and is trouble prone.

SUMMARY OF THE INVENTION

The present invention is directed to the development of a passive safety belt arrangement of the type in which one end of the belt is retained in a slide and locked in a restraining position, which arrangement has a simple and minimally trouble prone construction. To solve this task it is proposed according to this invention that the locking mechanism comprise a swiveling locking pawl acted upon in the direction of engagement by a spring. The locking pawl features a cam-like projection which functions in conjunction with a slide-positioning device so as to swivel the locking pawl into the release position. The fact that the swiveling locking pawl is controlled by the sliding element with which the guide is equipped, makes for a very simple and secure operation.

In an illustrative embodiment of the invention the locking pawl has a locking nose which engages in hook fashion behind a recess in a slide element. The safety belt is articulately connected to this slide and it is held in adjustable fashion in the guide. The sliding element is advantageously driven by a flexible rack of known type, which rack comprises a steel cable around which is wound a wire helix. The cable has one end that is not covered by the wire helix, on which end the slide element is slidably mounted. The cam-like projection of the locking pawl rests against the end of the steel cable which is not covered by the wire helix and is acted upon by the wire helix for the purpose of swiveling the locking pawl from its engagement position to a release position.

BRIEF DESCRIPTION OF THE DRAWINGS

The foregoing and other features of the present invention will be more readily apparent from the following detailed description and drawings of an illustrative embodiment of the invention in which.

DESCRIPTION OF AN ILUSTRATIVE EMBODIMENT

Figure 1:
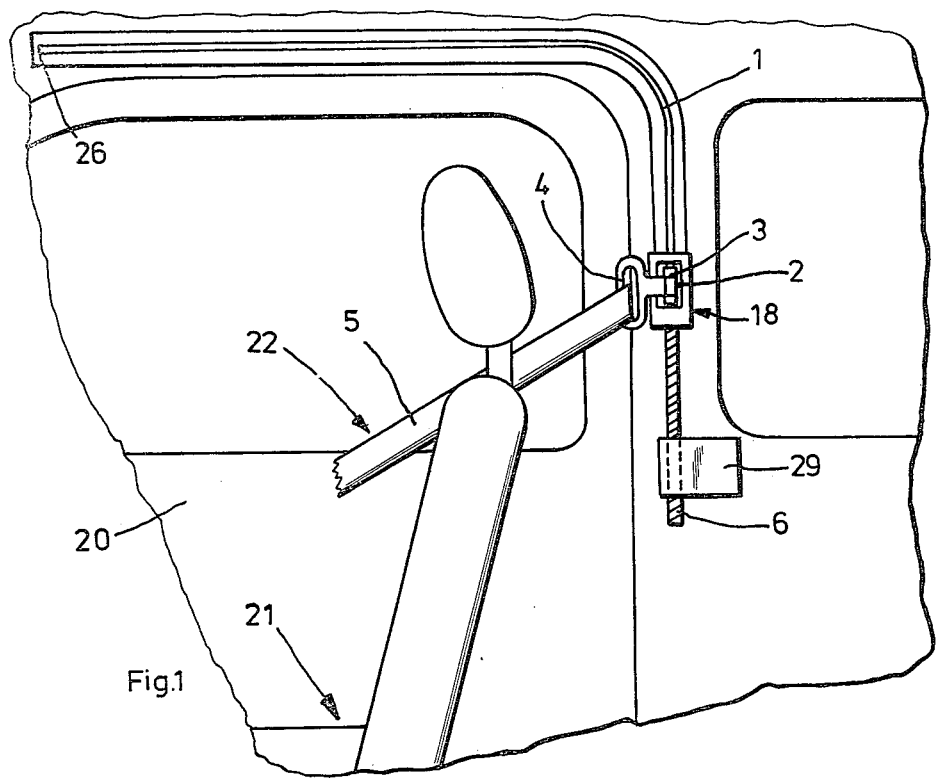
FIG. 1 shows a partial view of the interior of a vehicle equipped with a safety belt having one end in a slide equipped with a locking mechanism.

In the drawings a guide 1 is shown mounted on the frame of the vehicle, e.g., a passenger automobile. The guide can advantageously be made from a tube slit lengthwise and fastened above an opening for a door 20 in the vicinity of a vehicle seat 21, which seat is to be equipped with a passive passenger safety belt arrangement 22. The safety belt arrangement has a diagonal shoulder belt 5, only part of which is shown, and perhaps a lap belt and/or a knee belt. Instead of a lap belt or a knee belt there can also be provided an energy absorbing inpact element located on the vehicle frame adjacent the passenger's knees for restraining the lower portion of the passengers body.

In the guide 1 there is a member or slide 2 articulately connected to the belt 5, which slide can be shifted lengthwise in the guide. For example, a belt fitting 4 connected to one end of the safety belt 5 can be articulately connected to the slide 2 by means of a hinge element, e.g. a bolt hinge 3. A tension and compression resistant shifting element is used to the shift slide 2 in the guide 1, which element is comprised of a flexible rack 6 of the type used to lower window panes. This rack includes a steel cable 7 around which is spirally wound a wire helix 8. Flexible rack 6 is shifted back and forth between an off position toward the end 26 of the guide, in which the safety belt is raised away from the body of the vehicle passenger, and a restraining position near the bottom of the vertical section of the guide, in which the the safety belt is brought to bear against the body of the vehicle passenger. The shifting is performed by means of a drive 29, such as a sprocket driven by an electric motor via a worm gear. The drive has a control device (not shown) which ensures that the safety belt is automatically brought into the restraining position after the motor of the vehicle has been started and the door of the vehicle has been closed, and into the off position when the door is opened.

Figure 2:
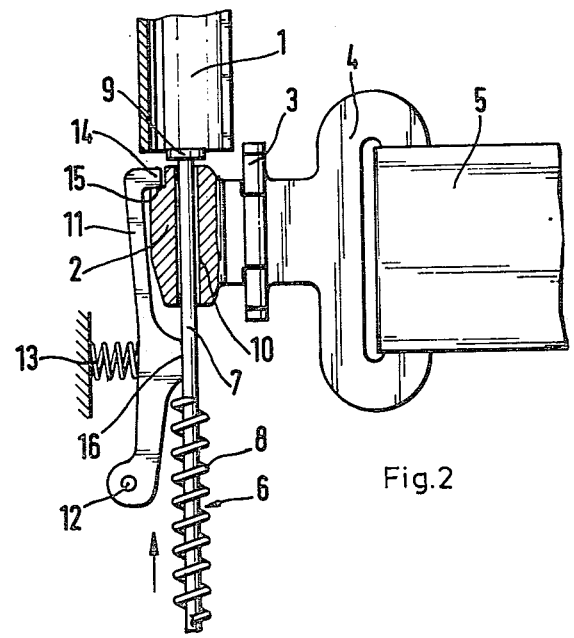
FIG. 2 shows in schematic form and partly in section an example of the implementation of the locking mechanism of FIG. 1 according to the present invention.

In order to ensure that the belt remains in its restraining position, which extends vertically along door column 23 behind the shoulder of the passenger, even if the vehicle overturns, and to prevent the load on the belt from pushing the slide upward in the guide and out of the restraining position, the invention provides for a locking mechanism 18. The locking mechanism as best shown in FIG. 2 includes a swiveling locking pawl 11 that swivels around pivot 12. When the safety belt 5 is in the restraining position shown in the drawings, a locking nose 14 at the end of the locking pawl engages in hook fashion behind a recess 15 in the slide 2. Locking pawl 11, which is spring-loaded in the engagement direction by a spring 13, features a cam-like projection 16 which, when in the restraining position, bears against the end of the steel cable 7 which is not covered by the wire helix 8. This uncovered end of the steel cable 7 also holds the slide 2 in slidable fashion, i.e. the steel cable 7 passes freely through a lengthwise hole 10 in the slide 2. At the end of the steel cable 7 there is fastened a drive disk 9.

The function and operating mode of the locking mechanism according to the invention are as follows. When the slide 2 is shifted in the guide 1, the locking pawl 11 stays in its release position as long as the cam-like projection 16 slides along the wire helix 8. Only when the slide 2 reaches the location assigned as the restraining position of the safety belt 5, does the cam-like projection 16 (helped by the spring 13) bear against the end of the steel cable 7 which is not covered by wire helix 8. When this occurs the pawl attains its engagement position, in which the locking nose 14 engages in hook fashion behind the recess 15 of the slide 2. In this position, not even a vertically upward load on the slide can lead to a vertical shifting of the slide in guide 1 which would release the belt from its restraining position. Consequently, the safety belt remains in its restraining position and is capable of transmitting the forces on the belt to the vehicle frame, even if the vehicle overturns.

If the belt is to be returned to its off position, the flexible shaft 6 is driven in the opposite direction, i.e. the direction of the arrow in FIG. 2. As a result the wire helix 8, whose diameter is larger than that of the cable 7, hits the cam-like projection 16 of the locking pawl 11 and pushes it back into the release position. During this motion, the end of the steel cable 7 that is not covered by wire helix 8 can slide freely in the large diameter hole 10 in the slide 2, because slide 2 is only driven by the flexible shaft 6 when the end of helix 8 bears against it.

While the present invention has been particularly shown and described with reference to a preferred embodiment thereof, it will be understood by those skilled in the art that various changes in form and details may be made therein without departing from the spirit and scope of the invention.

We claim:

1. A passive safety belt arrangement for vehicles, for example, passenger automobiles, including a safety belt articulately connected to a slide; a slide-positioning device for shifting the slide within a guide fastened to the frame of the vehicle in the region of a door opening located in the vicinity of a vehicle seat, said shifting taking place between an off position in which the safety belt is raised away from the body of a passenger in said seat and a restraining position which brings the safety belt in contact with the passenger's body roughly at the height of his shoulders, within the range of the restraining position the guide runs essentially vertically along a doorpost; and a locking mechanism that, when the belt is in the restraining position, secures the slide against motion that would release it from that position, characterized in that:

the slide-positioning device comprises a flexible rack made of a cable surrounded by a cover located over most of its longitudinal extent, an end of said cable being free of the cover so as to accomodate the slide in slidable fashion on that end; and said locking mechanism comprises a swiveling locking pawl acted upon by a spring so as to urge it in the direction of engagement with said slide, said locking pawl having a cam-like projection which rests against the end of the cable which is free of the cover whenever the slide is in the restraining position, said projection being acted on by the cover of said slide-positioning device so as to swivel the locking pawl out of engagement with said slide upon movement of the flexible rack.

2. A safety belt arrangement according to claim 1, characterized in that the locking pawl includes a locking nose which engages in hook fashion behind a recess in the slide, which slide is held in adjustable fashion in the guide.

3. A safety belt arrangement according to claim 1, characterized in that the flexible rack is made of a steel cable around which is spirally wound a wire helix forming the cover, an end of said cable being free of the wire helix so as to accomodate the slide in slidable fashion on that end.

4. A safety belt arrangement according to claim 3, characterized in that the cam-like projection of the locking pawl rests against the end of steel cable which is free of the wire helix whenever the slide is in the restraining position, and said projection is acted upon by the wire helix so as to swivel the locking pawl from its engagement position to the release position upon movement of said flexible rack.

* * * * *